UNITED STATES PATENT OFFICE.

GEORGE A. OLSON, OF PULLMAN, WASHINGTON, ASSIGNOR, BY MESNE ASSIGNMENTS, TO THE GOVERNMENT OF THE UNITED STATES AND TO THE PEOPLE THEREOF.

PROCESS FOR DRYING GLUTEN.

1,289,883.            Specification of Letters Patent.       Patented Dec. 31, 1918.

No Drawing.       Application filed December 23, 1915.  Serial No. 68,447.

(DEDICATED TO THE PUBLIC.)

*To all whom it may concern:*

Be it known that I, GEORGE A. OLSON, a citizen of the United States, residing at Pullman, in the State of Washington, whose post-office address is Pullman, Washington, have invented a certain new and useful Process for Drying Gluten.

The invention herein described and claimed may be used by the Government of the United States or any of its officers or employees in the prosecution of work for the Government, or any person in the United States, without payment to me of any royalty thereon.

My invention relates to a process for drying gluten.

The object of my invention is to produce a gluten which will retain its original physical properties of a tough, coherent, elastic mass when used to improve flours, meals and similar products for baking purposes, thereby making such products more stable and porous, or when used directly in or in combination with other substances than flour when mixed with yeast, salt and sugar, forms porous gluten or glutinous bread, which is more readily digestible. This is impossible with any of the nitrogen materials which do not have properties similar to the physically unaltered wheat gluten.

In practising my invention I first roll a quantity of freshly prepared, unfermented or unmodified wheat gluten into a firm ball under water, place the same on a smooth aluminum plate or other suitable receptacle, and place the gluten in a vacuum oven which registers a temperature on the thermometer in the water compartment of the oven of 85° centigrade. Any of the standard type vacuum ovens upon the market may be used for this purpose. The oven is then securely closed and the vacuum pump turned on. The pressure within the oven is reduced to 110 millimeters of mercury. The heat in the chamber seals the surface of the gluten so that it becomes difficult for the moisture beneath the surface of the gluten to escape. The water enveloped in the gluten in about five to ten minutes develops a pressure greater than the pressure surrounding the gluten and thereby forces the gluten to expand while the moisture simultaneously tends to keep the sub-surface of the external layer of the gluten elastic and coherent. The expansion of the gluten finally reaches a volume of about fifty to sixty times that which it originally had. At this point the steam vaporizes, condenses on the view glasses and finally the moisture disappears. After the glass clears the drying is continued from five to ten minutes longer to insure that the gluten has been thoroughly dried throughout the entire mass. The pressure is then slowly increased in the oven until it reaches atmospheric pressure, by opening the air inlet. The oven is then opened and the expanded gluten removed. The expanded dry gluten is then crumbled, ground, either on a bur mill or rolls, and finally bolted to suitable fineness.

Having thus described my invention, I claim:

A process of gluten preparation comprising rolling a quantity of gluten into a solid mass under water, placing such mass in an oven heated to a temperature lower than but approximating 100 degrees centigrade, reducing the pressure within the oven during the slow drying of the gluten to cause the mass to fully expand, and after the thorough drying of the gluten gradually increasing the pressure to atmospheric.

In testimony whereof, I affix my signature in the presence of two subscribing witnesses.

GEORGE A. OLSON.

Witnesses:
 INA D. CARDIFF,
 H. B. CLEES.